(12) United States Patent
Adler et al.

(10) Patent No.: US 6,336,329 B1
(45) Date of Patent: Jan. 8, 2002

(54) HYDRAULIC CYLINDER

(75) Inventors: Dieter Adler, Herzogenaurach; Gerhard Prosch, Höchstadt/Aisch; Sigurd Wilhelm, Erlangen; Wilfried Eckert, Höchstadt/Aisch, all of (DE)

(73) Assignee: Ina Walzlager Schaffler oHG, Herzogenaurach (DE)

( * ) Notice: Subject to any disclaimer, the term of this patent is extended or adjusted under 35 U.S.C. 154(b) by 0 days.

(21) Appl. No.: 09/469,929

(22) Filed: Dec. 21, 1999

(30) Foreign Application Priority Data

Dec. 21, 1998 (DE) ........................ 298 22 706 U
Dec. 21, 1998 (DE) ........................ 298 22 705 U

(51) Int. Cl.[7] ............... F16D 31/02; F16J 1/00
(52) U.S. Cl. ............... 60/588; 92/256; 92/128
(58) Field of Search ............ 60/585, 586, 587, 60/588; 92/128, 187, 188, 255, 256

(56) References Cited

U.S. PATENT DOCUMENTS

| | | | | |
|---|---|---|---|---|
| 3,787,127 A | * | 1/1974 | Cutler | 403/133 |
| 4,989,498 A | * | 2/1991 | Mori et al. | 60/588 X |
| 5,063,743 A | * | 11/1991 | Mori et al. | 60/588 X |
| 5,074,197 A | * | 12/1991 | Mori et al. | 60/588 X |
| 5,187,934 A | * | 2/1993 | Mori | 60/588 X |
| 5,251,446 A | * | 10/1993 | Mori et al. | 60/588 X |
| 5,290,120 A | * | 3/1994 | Osterfeld et al. | 92/187 X |
| 5,499,570 A | * | 3/1996 | Bergelin et al. | 92/128 X |
| 5,794,512 A | * | 8/1998 | Prosch et al. | 92/128 |
| 5,878,575 A | * | 3/1999 | Kreh et al. | 60/588 X |

\* cited by examiner

Primary Examiner—John E. Ryznic
(74) Attorney, Agent, or Firm—Darby & Darby

(57) ABSTRACT

A hydraulic master cylinder for a clutch or brake of a motor vehicle is simultaneously optimized for cost-effective mass production and for functional properties.

22 Claims, 4 Drawing Sheets

HYDRAULIC CYLINDER

BACKGROUND OF THE INVENTION

The invention relates to a master cylinder for a hydraulically operated clutch or brake of a vehicle. It is customary in the field of automotive technology that a device that functions by the application of a force is operated by means of hydraulic forces. Required for this purpose are so-called master cylinders, also called working cylinders, that serve to convert a mechanical force into a hydraulic force. The master cylinder is connected through a pressure conduit to the device that is to be hydraulically operated, e.g., a slave cylinder.

The invention further relates to a hydraulic cylinder, particularly a master cylinder for hydraulic systems of motor vehicles, with a cylinder housing comprising a cylinder compartment and with a piston that is guided for axial movement inside the cylinder compartment and sealed against the cylinder wall. The piston has a cup-shaped bushing that is closed against the cylinder compartment. Arranged inside the bushing is an insert body containing an essentially spherical cavity to accommodate a spherical head that is integrally connected as a single part with a swiveling piston rod that extends to the outside of the cylinder housing.

The working cylinder comprises a housing that is made of a polymer material and contains a pressure compartment formed (e.g., bored) as a cylindrical blind hole. The pressure compartment is connected to a supply port and a pressure port and accommodates an axially movable piston. A guide sleeve is arranged inside the housing at an axial distance from the pressure compartment and surrounds the piston when the latter is in a neutral position. A piston rod is attached by a swivel joint to the piston and connects to a manually operated pedal device.

A working cylinder of the kind mentioned at the beginning is known from DE 38 16 608 A1. Inserted in the housing of the known working cylinder is a short guide sleeve of a length that is less than 30% of the lengthwise dimension of the piston. For additional support of the piston in its neutral position, the known working cylinder is further provided with a holder element called "sheet-metal cup" that surrounds the piston on the outside. The known working cylinder has a total of three seals for the piston and the guide sleeve. A primary seal is on the outside fitted into the housing and has a sealing lip towards the inside that lies against the outside surface of the piston. A disk is placed ahead of the primary seal in the direction of the guide sleeve. The disk is provided with radial channels distributed over its circumference on the side that faces towards the back of the primary seal. The channels allow the pressure medium to be replenished when the piston is in its neutral position and if there is a pressure differential between the reservoir and the pressure compartment of the working cylinder.

Starting from the supply port, there is a fluid-flow connection through a cylindrical gap formed on the guide sleeve by a radially stepped-off section that extends to the back of the primary seal and continues into a radial channel of the intermediate disk before the pressure medium enters the pressure compartment through axial openings of the piston. Because the radial channels of the disk correspond with the axial openings of the piston, it is imperative for the disk to be installed in its correct orientation. If the disk is installed incorrectly, i.e., with the radial channels facing in the direction of the guide sleeve, the self-regulated in-flow of pressure medium through the supply port from the reservoir is blocked. A grooved ring seal, inserted at the edge of the guide sleeve, has an inner sealing lip lying against the piston. Furthermore, a seal ring for sealing a cylindrical gap between the guide sleeve and the housing wall is inserted into a ring groove of the guide sleeve and lies against the housing wall.

A hydraulic cylinder of the kind mentioned above is further known from DE 196 20 580 A1. This hydraulic cylinder, configured as a master cylinder, comprises a piston that is composed of more than one part. A cup-shaped bushing that is closed towards the pressure compartment contains an insert body with a spherical cavity to accommodate the head of a piston rod. The insert body is held in place by a radially inward-facing flange that is formed on the bushing after the insert body has been installed. This type of construction takes several assembly steps for the completion of the piston.

Known from DE 196 08 132 A1 is a hydraulic cylinder, particularly a master cylinder for hydraulic systems of motor vehicles, where the cylinder itself has a spherical cavity into which the spherical head of the piston rod is inserted under pressure. The opening of the spherical cavity is at a distance from the piston wall so as to allow the spherical head to be pushed into place. To prevent the spherical head from leaving the cavity when the piston is pulled against an end stop in the cylinder housing, a retaining ring is pushed into place between the cylinder wall and the opening area of the cavity.

A piston of this type of construction is expensive to manufacture because the spherical cavity is formed directly into the piston and also because a ring-shaped space has to be provided between the piston wall and the spherical cavity. Furthermore, a snug fit of the spherical head in the cavity is not assured because the inserted ring only fills the ring-shaped space but has no pre-tensioning effect on the exterior wall of the cavity, as there is no place provided where a forced deformation could be applied to the end portion of the cavity.

A further embodiment of the same document, in which the piston is configured in an essentially known way as a dual piston for two hydraulic circuits, shows the spherical head engaged in only a hemispherical recess of the piston, so that under a pulling force the piston rod lifts off from the recess. Therefore it is only due to a spring in the cylinder compartment that the piston is returned to its initial position.

Further known from DE 44 05 581 A1 is a master cylinder with a bearing element deep inside the piston. The bearing element, which has a spherical cavity in which the spherical head of the piston rod is inserted, is positioned at such a depth inside the piston that disassembly is impossible once the bearing element has been pushed into place inside the piston. Here, too, the manufacture of the piston is very expensive because the interior space of the piston has to be finished in a very expensive process, particularly due to the need for a groove located far back inside the piston that is engaged by noses of the bearing element. Also, the end portion of the spherical cavity of the bearing element does not have a defined area where it is elastically deformable and, consequently, the dimensional tolerances, too, have to meet exacting requirements.

OBJECT OF THE INVENTION

Therefore, in view of the disadvantages of the known device, the present invention has the object of providing a master cylinder that is optimized with regard to the design of its components and provides a highly effective fluid-flow connection when there is a pressure difference between the reservoir of the pressure medium and the pressure compartment. Another requirement is for the working cylinder to be manufacturable in a functionally safe, simple assembly process. A further object of the invention is to avoid the drawbacks of the known solutions and to provide a hydraulic cylinder, particularly a master cylinder, that is cost-effective as well as uncomplicated to produce and assemble. Also required is that the individual components can be completed separately without the need for other subsequent work operations. In addition, the hydraulic cylinder is to be suitable for mass production.

SUMMARY OF THE INVENTION

In hydraulic cylinders according to the invention, the stated object is attained through the following improvements:

a) The master cylinder comprises a guide sleeve that extends axially out of the housing and surrounds the piston when the latter is in a neutral position, without the need for an additional component.

b) The guide sleeve is positioned in an oriented condition in the housing of the master cylinder in order to provide an end stop that is integrated into the guide sleeve and to prevent contact between the piston rod and the guide sleeve in the exit area of the piston rod in a working mode of the cylinder.

c) The arrangement of a step in the guide sleeve on the side of the pressure compartment accommodates a secondary seal and at the same time allows a centered positioning of a space-holding disk that is inserted between the primary seal of the master cylinder and the guide sleeve.

d) The space-holding disk has radially directed passages or cutouts that communicate with the supply port when the space-holding disk is seated in position. The centered seating position of the space-holding disk in the guide sleeve prevents an incorrect assembly that would block the self-regulated flow of pressure medium from the reservoir through the supply port to the pressure compartment when there is a pressure differential between the reservoir and the pressure compartment or, more precisely, a condition of underpressure in the pressure compartment.

e) The design concept for the space-holding disk provides for a cylindrical gap between the piston and the inside wall of the space-holding disk. When the piston is in its neutral position, the cylindrical gap is followed by a flow passage running between the radially inner lip of the primary seal and the piston to the pressure compartment, as is required for the self-regulated flow of pressure medium when there is a pressure differential between the pressure medium reservoir and the pressure compartment.

According to the invention, the space-holding disk has at least on one side a radial step, so that the stepped-up portion fits into a recess at the end of the guide sleeve in the installed condition. This configuration of the space-holding disk effectively prevents an incorrect installation. The correct installation of the space-holding disk can be verified even after the master cylinder has been completely assembled, because a radial step in the guide sleeve will be aligned flush with the end surface of the master cylinder only if the space-holding disk is installed in the correct orientation.

According to the inventive design concept, the piston comprises a cup-shaped steel bushing that is closed towards the pressure compartment. Two half-shells of a polymer material are fitted inside the steel bushing and held securely in place by a radially inward-directed flange at the open side of the steel bushing. The half-shells of polymer material enclose a spherical cavity that provides a form-fitting seat for the spherical head of a piston rod. The following assembly steps are proposed for installing the piston rod in the piston: The polymer bearing shells, which are connected by a hinge at one end, are spread apart and the spherical head of the piston rod is inserted axially into the cavity of the bearing shells. Subsequently, the steel bushing is slipped over the half-shells and, as a last step, the assembled module is secured by press-forming an inward-directed flange on the bushing.

To achieve an unobstructed fluid flow from the supply port, i.e., from the hydraulic reservoir, to the pressure compartment when the piston is in a neutral condition and there is a pressure drop from the reservoir to the pressure compartment, the inventive concept provides for a ring gap to occur between the primary seal and the piston. According to the invention, the piston has one end position corresponding to a maximum volume of the pressure compartment. In this condition, the piston is retracted axially from the radially inner lip of the primary seal, whereby a ring gap is formed. Thus, the pressure medium can flow in an advantageous manner from the reservoir through the supply port and the radial passages of the space-holding disk to the piston where it turns into the axial direction, passes through a first cylindrical gap of the space-holding disk and through a second gap between the piston and the radially inner lip of the primary seal, and enters into the pressure chamber. This flow channel can also be used in the reverse direction for fluid to flow from the pressure compartment to the reservoir, e.g., to allow for volume expansion due to temperature.

Either as an alternative or as an additional measure, the invention provides that an end portion of the piston facing towards the pressure compartment be equipped with lengthwise grooves distributed over its circumference. The lengthwise grooves allow pressure medium to flow when the piston is in its neutral position even if the radially inner lip of the primary seal is in contact with the piston. This condition can occur, e.g., with an unfavorable tolerance build-up between the components in the neutral position of the piston. The effectiveness of the lengthwise grooves is improved if the latter are of equal or greater length than the wall thickness of the piston bushing.

In a further embodiment of the invention, the guide sleeve is designed so that it can only be installed with correct orientation. As a suitable means for this purpose, the guide sleeve has, e.g., a radially outward-directed protrusion that engages a lengthwise groove of the housing. Alternatively, the opposite arrangement may be chosen where a radially inward-directed nose of the housing engages a lengthwise groove of the guide sleeve. The directionally oriented installation makes it possible to provide a defined end stop for the clutch pedal. Because of the slot-shaped opening at the axially facing end of the guide sleeve where the swivel-mounted piston rod exits from the guide sleeve, the directionally oriented assembly is also necessary to prevent contact between the piston rod and the guide sleeve in the exit area of the piston rod when the working cylinder is in its operating mode.

In accordance with a further advantageous embodiment of the invention, the guide sleeve has a radially inward-directed border at its front end to secure the piston against being pulled out of the cylinder. Thus, the piston and piston rod are secured in the housing of the working cylinder in the preassembled state of the master cylinder unit. Furthermore, in the installed condition of the unit, this measure limits the travel of the clutch pedal against its working direction.

In order to achieve a durable and sealed joint, the guide sleeve is attached to the housing by a permanent, irreversible method. The methods of vibration welding or ultrasound welding are particularly suitable.

The object of the invention is further accomplished in that the piston can be pre-assembled as a unit that comprises the insert body and the piston rod and is ready to be inserted into the bushing. The insert body in its final, installed condition is secured by a snap connection in a fixed position inside the bushing. This simplifies the manufacture (more specifically, the assembly process) of the piston because there are fewer assembly steps, which translates into a clear cost advantage, particularly for large production lots.

In a further developed embodiment, the end of the bushing at the side of the piston rod is provided with inward-directed portions or an inward-directed border around its perimeter. The shape and alignment of the border are configured to allow on the one hand an unimpeded insertion of the insert body into the bushing and on the other hand have enough overlap with an elastically resilient, radially pre-tensioned portion of the insert body. The result is a durable, self-locking fixation by means of a snap connection that requires no additional work operation.

To simplify the assembly process (i.e., to reduce the number of steps), the bushing, which is deep-drawn from steel sheet metal stock, is pre-finished with the border already in place. Consequently, in comparison to prior-art pistons, the final step after the installation of the insert body, i.e., flanging the border of the bushing, has been eliminated.

An improvement in the assembly process is obtained if the bushing has an end portion of increased interior diameter on the side towards the piston rod.

As an advantageous feature, the insert body has a sleeve-like extension (also called a sleeve in the following parts of the description) extending beyond the spherical cavity in the direction of the piston rod. The sleeve is preferably made of one piece together with the insert body and has elevated projections or a ring shoulder along its exterior perimeter by which the insert body can be brought into engagement with the inward-pointing portions or the border of the bushing. The elevated projections or the ring shoulder, to perform their function as contact surfaces for the inward-pointing portions or the border of the bushing, have inclined cone-surface segments or a conical ring surface enclosing with the longitudinal piston axis an angle that slopes towards the spherical cavity. The cone-surface segments or the conical ring surface allow an elastic contact force to be generated with an axial force component holding the insert body clamped tight and a radial component holding the sleeve together so that the spherical head cannot come out of the cavity.

The outside circumference of the elevated projections or of the ring shoulder has one or more conical surface areas with a narrowing taper towards the spherical cavity and enclosing an acute angle with the longitudinal axis of the piston. This has the advantage that the insert body can be pushed through the inward-pointing portions or the border without requiring an abrupt deformation.

Furthermore, to provide an elastically resilient area, there is a neck portion of reduced diameter between the elevated projections or the ring shoulder and the spherical cavity. This simplifies the assembly process and also allows a certain amount of radial compression to be exercised permanently against the elevated projections or the ring shoulder without the spherical head getting jammed tight in the spherical cavity. Nevertheless, the feature assures that the spherical head is firmly seated in the cavity. A similar purpose is served by the measure that the one-half of the spherical cavity nearer to the sleeve has at least a portion of greater radius than the radius of the opposite half. Thus, the area of the spherical cavity, too, is made elastically resilient, so that the spherical head can be inserted more easily into the cavity but will nevertheless be seated without play after the assembly has been completed.

The insert body can be manufactured and assembled in a particularly favorable way, if it is composed of two half-shells of identical shape and parted along a plane that contains the central longitudinal axis of the piston. Each of the half-shells has at least one bolt-like projection that can be pressed into an opening of its counterpart in the assembly so that, after the insertion of the spherical head, the half-shells are attached to each other through a double connection with one bolt and one opening per half-shell.

An extension element or an extended border of the sleeve at the far end from the spherical cavity and beyond the elevated projections or the ring shoulder can be provided as an end stop for the piston, if the cylinder housing has a corresponding end barrier. This arrangement keeps shock forces away from the inward-pointing portions or the border flange of the bushing and their counterparts, the inclined cone-surface segments or the conical ring surface of the sleeve.

The novel features that are considered as characteristic of the invention are set forth in particular in the appended claims. The improved apparatus itself, however, both as to its construction and its mode of operation, together with additional features and advantages thereof, will be best understood upon perusal of the following detailed description of certain presently preferred specific embodiments with reference to the accompanying drawing.

DETAILED DESCRIPTION OF THE INVENTION

Figure 1:
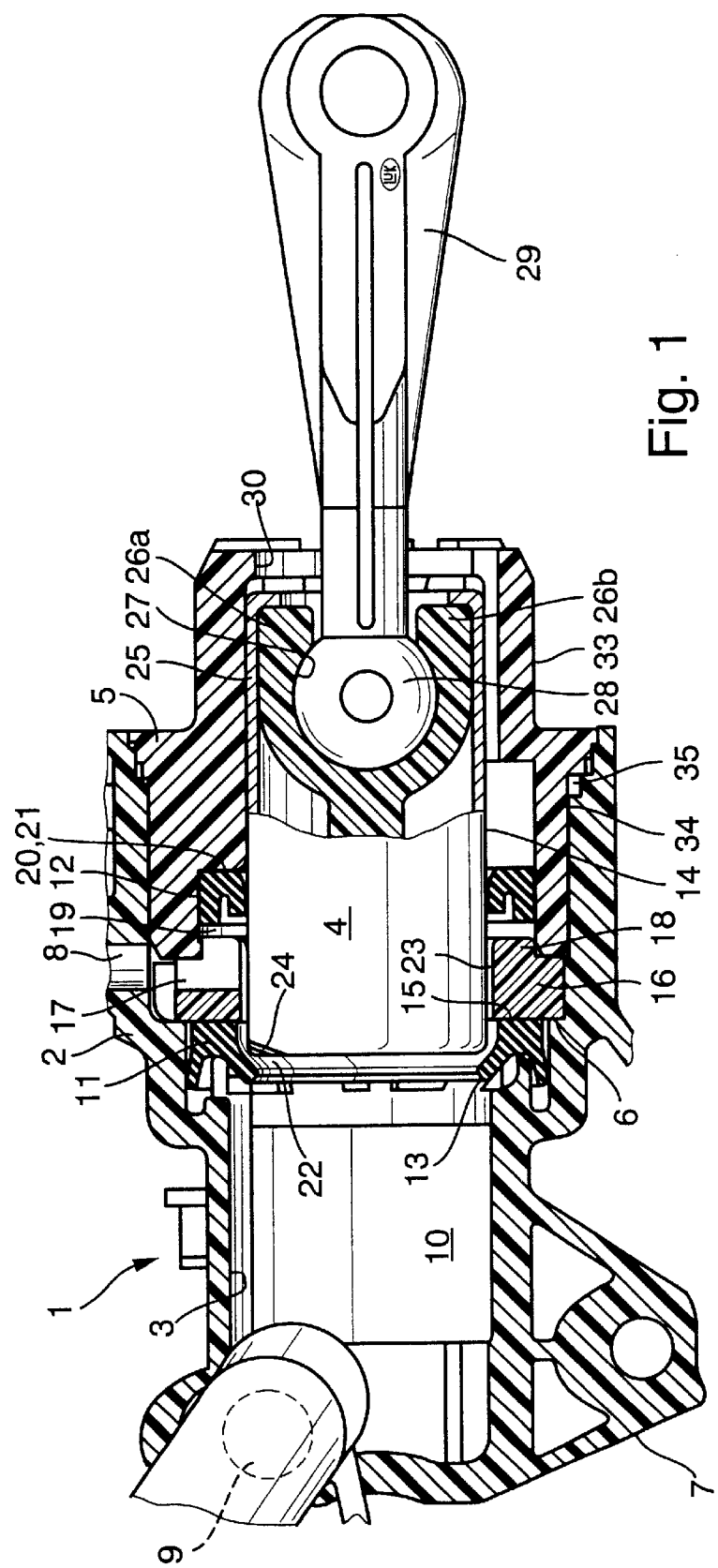
FIG. 1 represents a longitudinal section of a master cylinder in accordance with the invention.

FIG. 1 represents a lengthwise section through a master cylinder 1 that is made of a polymer material. The interior space 3 (which could also be called a blind hole) inside the working cylinder 1 is mostly cylindrical and has radial steps. A first section of the interior space 3, which has the smallest interior diameter, serves to guide the piston 4. A guide sleeve 5 is inserted in the section of the interior space 3 that has the largest interior diameter. The height of the radial step 6 between the two sections corresponds to the wall thickness of the guide sleeve 5. Thus, the guide sleeve 5 and the narrowest-diameter section of the interior space 3 have the same inside diameter. The agreement between the inside diameters assures that the piston 4 is guided precisely regardless of its momentary position inside the housing 2.

The housing 2 is provided with two fastening lugs 7 with holes by which the housing 2 can be bolted, e.g., to a pedal device. The housing 2 further has an inlet port 8 connected to a pressure fluid reservoir and also a pressure port 9 where a pressure conduit can be connected.

The section with the smallest diameter of the interior space 3 represents the pressure compartment 10 which is delimited by the walls of the housing 2 and at one end by the axially facing end surface of the piston 4. To seal off the piston 4, the master cylinder 1 has a primary seal 11 and a secondary seal 12, both of which are grooved seal rings. The outside of the primary seal 11 is seated where the interior wall 2 has a radial step from the pressure compartment 10. When the master cylinder 1 is in operation, the radially inner lip 13 of the primary seal 11 closes and seals the gap against the outside surface 14 of the piston 4. The back 15 of the primary seal 11 rests against a space-holding disk 16 that has a toothed profile facing in the axial direction towards the guide sleeve 5. The toothed profile provides axial passages 17 at a position corresponding to the inlet port 8. The toothed portion of the space-holding disk 16 also has an axially protruding neck 18 that is centered in a frontal recess 19 of the guide sleeve 5. Set back axially from the protruding neck 18, the recess 19 of the guide sleeve 5 also serves as seat for the secondary seal 12. The backside 20 of the secondary seal 12 rests against a shoulder 21 of the guide sleeve 5.

The position of the piston 4 as shown in FIG. 1 represents a neutral position corresponding to the engaged condition of the clutch. In this position of the clutch, the pressure in the pressure compartment 10 corresponds to a large degree with the outside atmospheric pressure. Because the piston 4 is axially retracted from the inner lip 13 of the primary seal 11, a ring gap 22 is left open between the sealing lip and the piston. Thus, if the quantity of pressure medium needs to be adjusted, the pressure fluid can be introduced into the pressure compartment 10 along a flow path that leads from the inlet port 8 through the passage 17 of the space-holding disk 16, then through a cylindrical gap 23 between the circumference 14 of the piston 4 and the inner wall of the space-holding disk 16, along the primary seal 11 and through the ring gap 22. In addition or as an alternative to the ring gap 22, the invention includes grooves 24 running lengthwise on the outside of the piston 4. The grooves 24 that are provided in an area of defined length on the circumference of the piston 4 also have the purpose of allowing an unrestricted inflow of pressure medium from the reservoir to the pressure compartment 10. It is suggested to make the grooves 24 as long as or longer than a wall thickness of the piston bushing 25.

The guide sleeve 5 is designed to be installed in a defined position. This is accomplished by providing the guide sleeve 5 with a longitudinal groove 35 that is engaged by a radial projection 35 of the housing 2. In its neutral position as illustrated in FIG. 1, the piston is surrounded mostly by the guide sleeve 5. This is accomplished by providing the guide sleeve 5 with an axially directed extension 33.

The piston 4 is assembled of a plurality of parts and comprises two bearing shells 26a, 26b that are made of a polymer material and are encased in a piston bushing 25 that is made of steel. At the far end from the pressure compartment 10, the bearing shells 26a, 26b together form a spherical cavity 27 that conforms to and holds a spherical head 28 of the piston rod 29. A radially inward-directed border 30 of the guide sleeve 5 secures the piston 4 against being pulled out of the guide sleeve.

Figure 2:
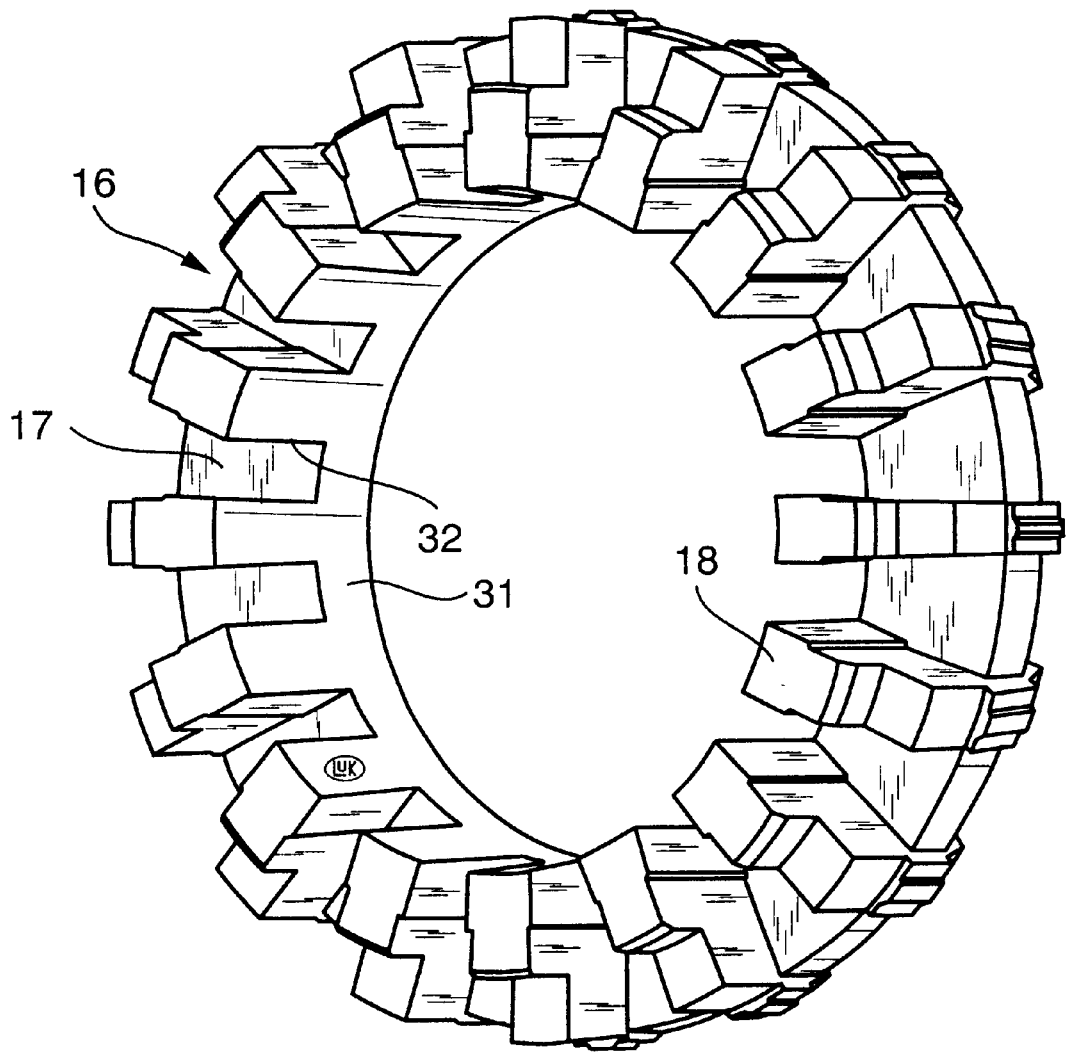
FIG. 2 represents an illustration of the space-holding disk, a component that is installed between the primary seal and the guide sleeve.

FIG. 2 gives a three-dimensional view of the space-holding disk 16, which is preferably made of a polymer material. The space-holding disk 16 has a solid ring portion at the back and axially directed projections 32 to one side of the solid ring portion. The projections 32 are arranged symmetrically along the circumference, and between them are radially directed passages 17. FIG. 2 also illustrates the radial step in the projections 32 whereby a centered installation of the space-holding disk 16 in the recess 19 of the guide sleeve is assured.

Figure 3:
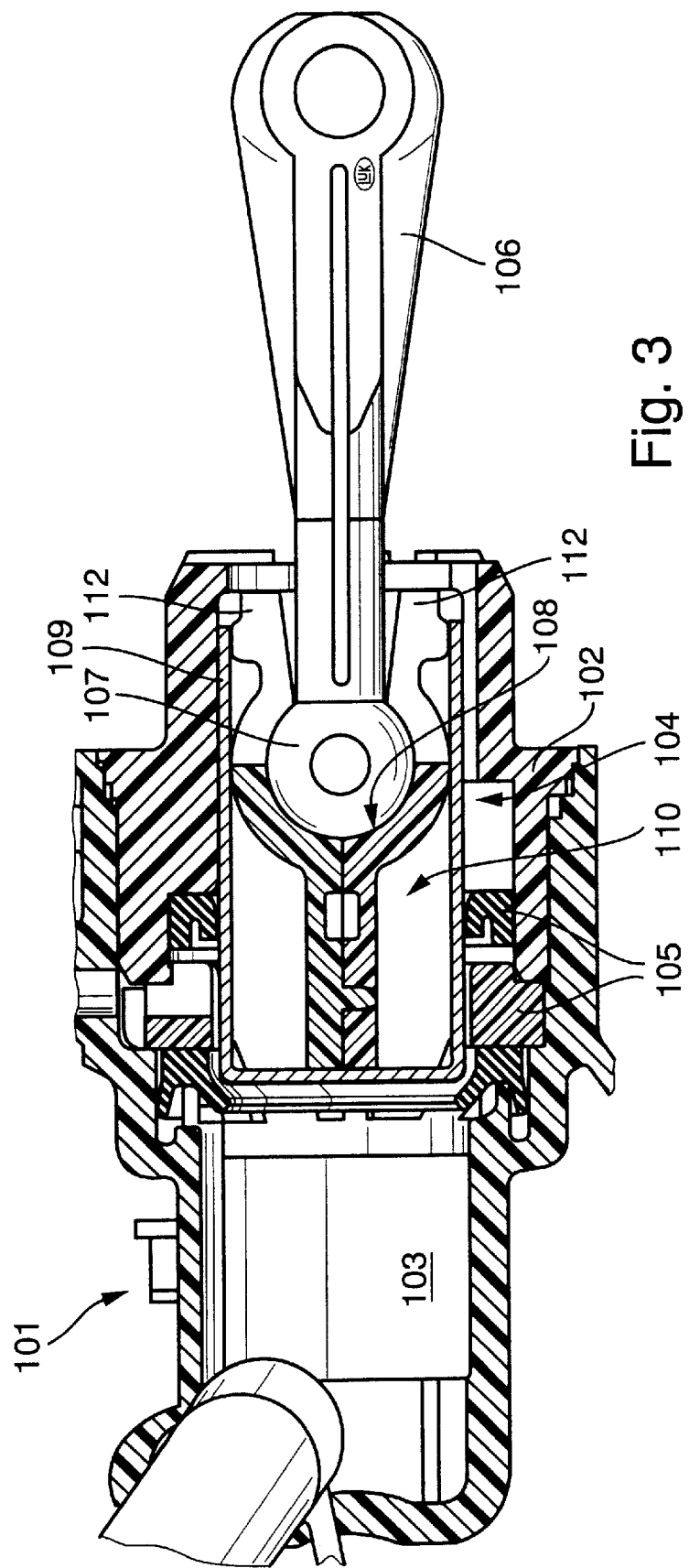
FIG. 3 represents a longitudinal section of a hydraulic cylinder, particularly a master cylinder, for hydraulic systems of motor vehicles.
Figure 4:
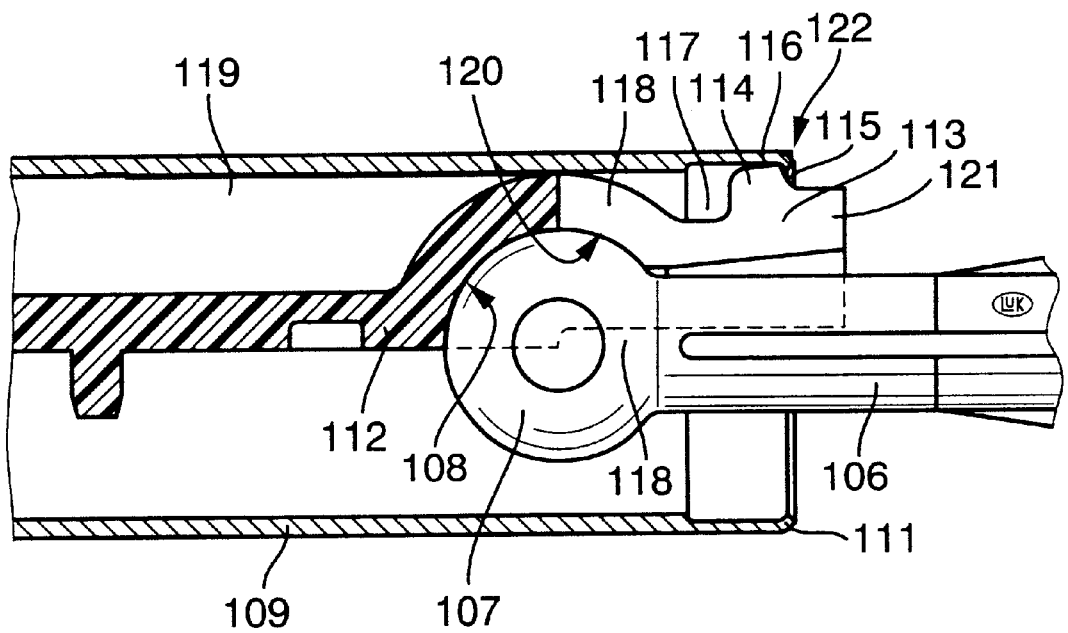
FIG. 4 represents a longitudinal section of the piston of the hydraulic cylinder of FIG. 3.
Figure 5:
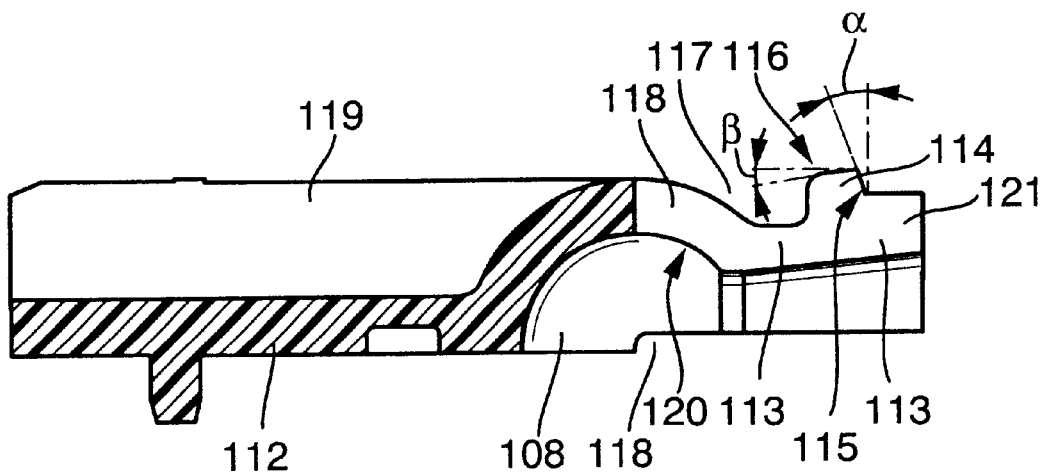
FIG. 5 represents a section through a half-shell of the insert body of the piston.

To the extent that details are illustrated in FIGS. 3 to 5, a hydraulic cylinder 101 is shown with a cylinder housing 102 and a cylinder compartment 103. Inside the cylinder compartment 103, a piston 104 can move along the axial direction, and passage of fluid around the piston is blocked by means of seals 105 that are seated in the cylinder housing 102. A piston rod 106 has an essentially spherical head 107 that is held in a spherical cavity 108. The piston 104 has a bushing 109 containing an insert body 110. The bushing 109, preferably made of metal, has the shape of a cup with the closed end facing away from the piston rod 106. The other end has along the perimeter an inward-directed border 111 that is preferably made in a flanging process. In this embodiment, the insert body 110—although it could also be made as a monolithic unit—consists of half-shells 112, preferably of identical shape and made of polymer material. However, for the sake of simplicity, the insert body will be mostly treated as a unit in the following description, but the features of the insert body as described in this embodiment are shared equally by the two half-shells.

As can be learned particularly from the FIGS. 4 and 5, the insert body has a spherical cavity 108 that runs out into a sleeve-like extension 113 (or sleeve 113, for short) in the direction of the piston rod 106 (i.e., one half of a sleeve on each half-shell 112). The sleeve 113 has along its outside perimeter a ring shoulder 114 which, again, is shared between the half-shells 112. On the side that faces away from the spherical cavity 108, the ring shoulder 114 has a sloped conical surface 115 that encloses an acute angle a with the radial direction, i.e., a relatively steep angle. The outside circumference of the ring shoulder 114 has a conical surface 116 with a narrowing taper of slope angle β towards the spherical cavity. Between the ring shoulder and the spherical cavity, the sleeve 113 has a narrower neck portion 117, so that the outside contour of the insert body conforms largely to the interior shape of the spherical cavity. Furthermore, the insert body 110 has axially oriented slits 118 in the area of the sleeve 113 and over a part of the spherical cavity. As can be seen in FIG. 5, the slits are also distributed over the half-shells including a slit formed at the joint between the two half-shells. It should further be pointed out that the part of the insert body 110 on the opposite end from the piston rod has an essentially cruciform cross-section. The webs 119 on the backside of the half-shells 112 and analogous flaps extending in the mating plane of the two half-shells rest against the interior wall of the bushing 109 and at their axially facing end against the bottom of the cup-shaped bushing. This configuration provides a good support and at the same time minimizes the weight of the insert body.

It should also be pointed out that the one half of the spherical cavity that is identified as 120 and adjoins the sleeve 113 has at least a portion of greater radius than the rest of the cavity. Furthermore, the interior surface of the sleeve from the spherical cavity to the edge has a conical taper narrowing towards the spherical cavity. In addition, the sleeve 113 has a ring-shaped extension, shown as extension element 121, which extends from the side of the ring shoulder that faces away from the spherical cavity.

The inventive configuration of the piston and the insert body provides the benefit of a particularly favorable and simple manufacturing process of the piston. The spherical head 107 of the piston rod 106 is pushed from the outside into the sleeve 113, whereby the sleeve and a significant part of the spherical cavity are spread apart far enough—due to the slits 118—that the spherical head 107 can be pushed all the way home into the spherical cavity 108. If the insert body 110 is made up of two half-shells, the installation of the piston rod is simplified even further because the spherical head 107 only has to be positioned between the half-shells that are then pressed together. Subsequently, the insert body 110 (or the insert body made up of the two half-shells 112) is inserted into the bushing 109 that already comes with the border 111 in place. The insertion is facilitated by the fact that a portion at the open end of the bushing has a greater inside diameter and the border 111 extends only so far to the inside that the insertion path is not obstructed for the main part of the insert body. The ring shoulder 114 and thus the rest of the insert body 111 can be pushed into the bushing 109 through the border 111 because the outer circumference 116 is conically tapered as well as compressible due to the slits 118. The ring shoulder 114, and thus the insert body, seats itself into place with the ring surface 115 against the interior surface of the border 111, forming a snap connection 122. To make the installation secure and durable, the ring surface 115 is sloped at an appropriate angle so that the insert body 110 is held firmly inside the bushing 109 even if there is an outward-directed pulling force acting on the piston rod. A certain amount of taper in the surface 115 is also advantageous because this tends to compress the end portion of the spherical cavity when a pulling force is exerted on the piston rod.

The narrowed-down neck portion between the spherical cavity and the ring shoulder 114 has the purpose of providing elastic resilience, so that the sleeve 113 can be compressed even if the spherical cavity rests against the spherical head. Because the one half 120 of the spherical cavity has an area of greater radius or the center of the sphere is offset inside the spherical cavity, this portion has a certain amount of resilience when the ring shoulder is compressed. The extension element 121 prevents the border of the bushing from hitting against a stop on the cylinder housing when the piston 104 is pulled out to the end of its travel range, a condition which could endanger the firm retention of the insert body inside the bushing. This is essential because, if the hydraulic cylinder is used as a master cylinder for hydraulic systems in motor vehicles, e.g. for a clutch, the piston rod is pulled out all the way to its end stop, due to the effect of spring forces acting on the piston rod when the driver takes his foot off the clutch pedal.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of the aforedescribed contribution to the art and, therefore, such adaptations should and are intended to be comprehended within the meaning and range of equivalence of the appended claims.

What is claimed is:

1. A hydraulic cylinder for a hydraulic system in a motor vehicle with a cylinder housing comprising a cylinder compartment and a piston that is sealed tight and guided for axial movement inside the cylinder compartment, the piston having a cup-shaped bushing that is closed towards the cylinder compartment and contains an insert body with an essentially spherical cavity holding a spherical head that is integrally connected as a single part with a swiveling piston rod that extends to the outside of the cylinder housing, comprising the improvements that the insert body and the piston rod are combined into a pre-assembled unit and that the pre-assembled unit is inserted into the bushing and fastened by means of a snap connection, wherein the bushing has at least one inward-pointing portion at the end that faces in the direction of the piston rod.

2. The hydraulic cylinder of claim 1, wherein the bushing is a pre-manufactured part made of sheet-metal steel by deep-drawing with the at least-one inward pointing portion being formed through a non-cutting process.

3. The hydraulic cylinder of claim 1, wherein an end section of the bushing pointing the piston rod has a greater inside diameter than the rest of the bushing.

4. The hydraulic cylinder of claim 1, wherein the insert body is held captive in a fixed position inside the cup-shaped bushing between a closed bottom portion of the bushing and the at least one inward-pointing portion of the bushing.

5. The hydraulic cylinder of claim 1, wherein the insert body has a sleeve-like extension beyond the spherical cavity in the direction of the piston rod and the sleeve-like extension has on its outside circumference at least one radial projection interacting with the at least one inward-pointing portion of the bushing.

6. The hydraulic cylinder of claim 5, wherein the at least one radial projection has a conically tapered surface enclosing with the longitudinal piston axis an angle that slopes towards the spherical cavity and serving as contact surface to be engaged by the at least one inward-pointing portion of the bushing.

7. The hydraulic cylinder of claim 5, wherein the at least one radial projection has a circumference with a conical taper narrowing towards the spherical cavity and enclosing an acute angle with the longitudinal axis of the piston.

8. The hydraulic cylinder of claim 5, wherein a neck portion of narrower diameter extends between the at least one radial projection and the spherical cavity.

9. The hydraulic cylinder of claim 5, wherein the insert body has slits extending parallel to the longitudinal axis of the piston through the sleeve-like extension and part of the way into the spherical cavity.

10. The hydraulic cylinder of claim 5, wherein the spherical cavity has a hemisphere oriented towards the sleeve-like extension where at least a part of the hemisphere has a greater radius than an opposite hemisphere of the spherical cavity.

11. The hydraulic cylinder of claim 1, wherein the insert body comprises half-shells of identical shape and parted along a plane that contains the central longitudinal axis of the piston and wherein further the half-shells comprise a means by which they can be attached to one another.

12. The hydraulic cylinder of claim 5, wherein the sleeve-like extension has at least one extension element located at a far end from the spherical cavity and beyond the at least one projection, the extension element protruding axially from the inward-pointing portion of the bushing after the insert body has been seated in the bushing.

13. A master cylinder for a hydraulic system in a motor vehicle with
a housing made of a polymer material and equipped with an inlet port, a pressure port, and a pressure compartment that is configured as a blind hole;
a piston that is inserted in the pressure compartment and axially movable, sealed by a primary seal and a secondary seal, the primary seal and the secondary seal being arranged at stationary locations at an axial distance from each other;

a piston rod with a swivel connection to the piston; and a guide sleeve that is made of a polymer material and inserted into the housing, comprising the improvements that the guide sleeve has an extension that projects axially from the housing and surrounds the piston when the latter is in a neutral position corresponding to a maximum volume of the pressure compartment;

the guide sleeve is inserted into the housing in an oriented condition and has a ring-shaped recess that is open towards the piston and located on a side of the guide sleeve that faces towards the pressure compartment;

the ring-shaped recess holds a secondary seal, the secondary seal having a backside resting against a shoulder of the guide sleeve and a radially inner sealing lip lying against the piston;

a space-holding disk is installed in an oriented condition between the primary seal and the guide sleeve;

the space-holding disk has at least one radially directed passage that communicates with the inlet port and leads to a cylindrical gap between the piston and the space-holding disk, the cylindrical gap leading to the pressure compartment by way of a flow passage that opens up between a radially inner lip of the primary seal and the piston when the piston is in the neutral position.

14. The master cylinder of claim 13, wherein the space-holding disk is centered coaxially with the guide sleeve by means of an axially protruding neck of the space-holding disk that fits into a matching frontal recess of the guide sleeve.

15. The master cylinder of claim 13, wherein the piston comprises a cup-shaped piston bushing that is closed towards the pressure compartment and contains half-shell inserts made of a polymer material.

16. The master cylinder of claim 15, wherein the half-shell inserts contain a spherical cavity providing a form-fitting means of attachment for a spherical head of a piston rod.

17. The hydraulic cylinder of claim 15, wherein the bushing has at least one inward-pointing portion at the end that faces in the direction of the piston rod.

18. The master cylinder of claim 13, wherein the primary seal is arranged inside the housing so that a ring gap is open between the radially inner lip of the primary seal and the piston when the piston is in the neutral position and thereby allows fluid to flow between the inlet port and the pressure compartment.

19. The master cylinder of claim 15, wherein an end portion of the piston that faces the pressure compartment has lengthwise-oriented grooves distributed over a circumference, the length of said grooves being at least equal to a wall thickness of the piston bushing.

20. The master cylinder of claim 13, wherein the guide sleeve has a lengthwise groove and the housing has a projection conforming to and engaging the groove, so as to ensure that the guide sleeve is inserted into the housing in the oriented condition.

21. The master cylinder of claim 13, wherein the guide sleeve has an outer end with a radially inward-directed border, whereby the piston is secured against being pulled out of the guide sleeve.

22. The master cylinder of claim 13, wherein the guide sleeve is connected to the housing permanently and irreversibly by a method selected from the processes of vibration welding and ultrasound welding.

* * * * *

UNITED STATES PATENT AND TRADEMARK OFFICE
CERTIFICATE OF CORRECTION

PATENT NO. : 6,336,329 B1
DATED : January 8, 2002
INVENTOR(S) : Dieter Adler, Gerhard Prosch, Sigurd Wilhelm and Wilfried Eckert It is certified that error appears in the above-identified patent and that said Letters Patent is hereby corrected as shown below:

<u>Title page,</u>
Item [73], Assignee, delete "Ina Walzlager Schaffler oHG, Herzogenaurach (DE)" and add -- LuK Lamellen und Kupplungsbau GmbH, Buhl/Baden (DE) --

Signed and Sealed this

Twenty-sixth Day of November, 2002

*Attest:*

*Attesting Officer*

JAMES E. ROGAN
*Director of the United States Patent and Trademark Office*